(12) United States Patent
Pittroff et al.

(10) Patent No.: US 6,723,153 B2
(45) Date of Patent: Apr. 20, 2004

(54) ISOLATION OF SF6 FROM INSULATING GASES IN GAS-INSULATED LINES

(76) Inventors: Michael Pittroff, Bronsartstrasse 16, Hannover (DE), 30161; Thomas Schwarze, Freundallee 3a, Hannover (DE), 30173; Heinz-Joachim Belt, Haferkamp 19, Burgwedel (DE), 30938

( * ) Notice: Subject to any disclaimer, the term of this patent is extended or adjusted under 35 U.S.C. 154(b) by 0 days.

(21) Appl. No.: 09/988,820

(22) Filed: Nov. 20, 2001

(65) Prior Publication Data

US 2002/0062734 A1 May 30, 2002

Related U.S. Application Data

(63) Continuation of application No. PCT/EP00/00979, filed on Feb. 8, 2000.

(30) Foreign Application Priority Data

May 20, 1999 (DE) .......................................... 199 23 155

(51) Int. Cl.$^7$ .............................................. B01D 53/22
(52) U.S. Cl. ......................... 95/47; 96/4; 96/9; 96/14
(58) Field of Search ........................ 95/45, 47, 131, 95/133, 135; 96/4, 8, 10, 108, 130, 134, 142, 13, 14

(56) References Cited

U.S. PATENT DOCUMENTS

| | | | |
|---|---|---|---|
| 4,264,338 A | * | 4/1981 | Null ........................ 95/47 |
| 4,838,904 A | | 6/1989 | Sanders, Jr. et al. ........... 55/158 |
| 5,282,969 A | * | 2/1994 | Xu ............................. 95/45 X |
| 5,378,263 A | * | 1/1995 | Prasad ........................ 95/45 X |
| 5,482,539 A | * | 1/1996 | Callahan .................... 95/45 X |
| 5,599,380 A | * | 2/1997 | Koros ........................... 95/54 |
| 5,730,779 A | * | 3/1998 | Chernyakov et al. ........... 95/45 |
| 5,759,237 A | * | 6/1998 | Li et al. ..................... 95/45 X |
| 5,785,741 A | * | 7/1998 | Li et al. ..................... 96/14 X |
| 5,814,127 A | * | 9/1998 | Li ................................ 95/47 |
| 5,843,208 A | | 12/1998 | Anumakonda et al. ......... 95/47 |
| 5,855,647 A | * | 1/1999 | Li et al. ........................ 95/45 |
| 5,858,065 A | * | 1/1999 | Li et al. ..................... 95/47 X |
| 5,976,222 A | * | 11/1999 | Yang et al. .................... 95/45 |
| 6,004,377 A | * | 12/1999 | Tamata et al. ............ 95/131 X |
| 6,168,649 B1 | * | 1/2001 | Jensvold et al. ............... 95/47 |
| 6,187,077 B1 | * | 2/2001 | Li ................................ 95/47 |

FOREIGN PATENT DOCUMENTS

| | | |
|---|---|---|
| EP | 754487 | 1/1997 |
| EP | 853970 | 7/1998 |
| EP | 885841 | 12/1998 |

* cited by examiner

Primary Examiner—Robert H. Spitzer
(74) Attorney, Agent, or Firm—Crowell & Moring LLP

(57) ABSTRACT

Gas mixtures of $SF_6$ and $N_2$ which have been used as an insulating filler gas for underground cables can be separated by use of a membrane separation in order to recover the $SF_6$.

13 Claims, 1 Drawing Sheet

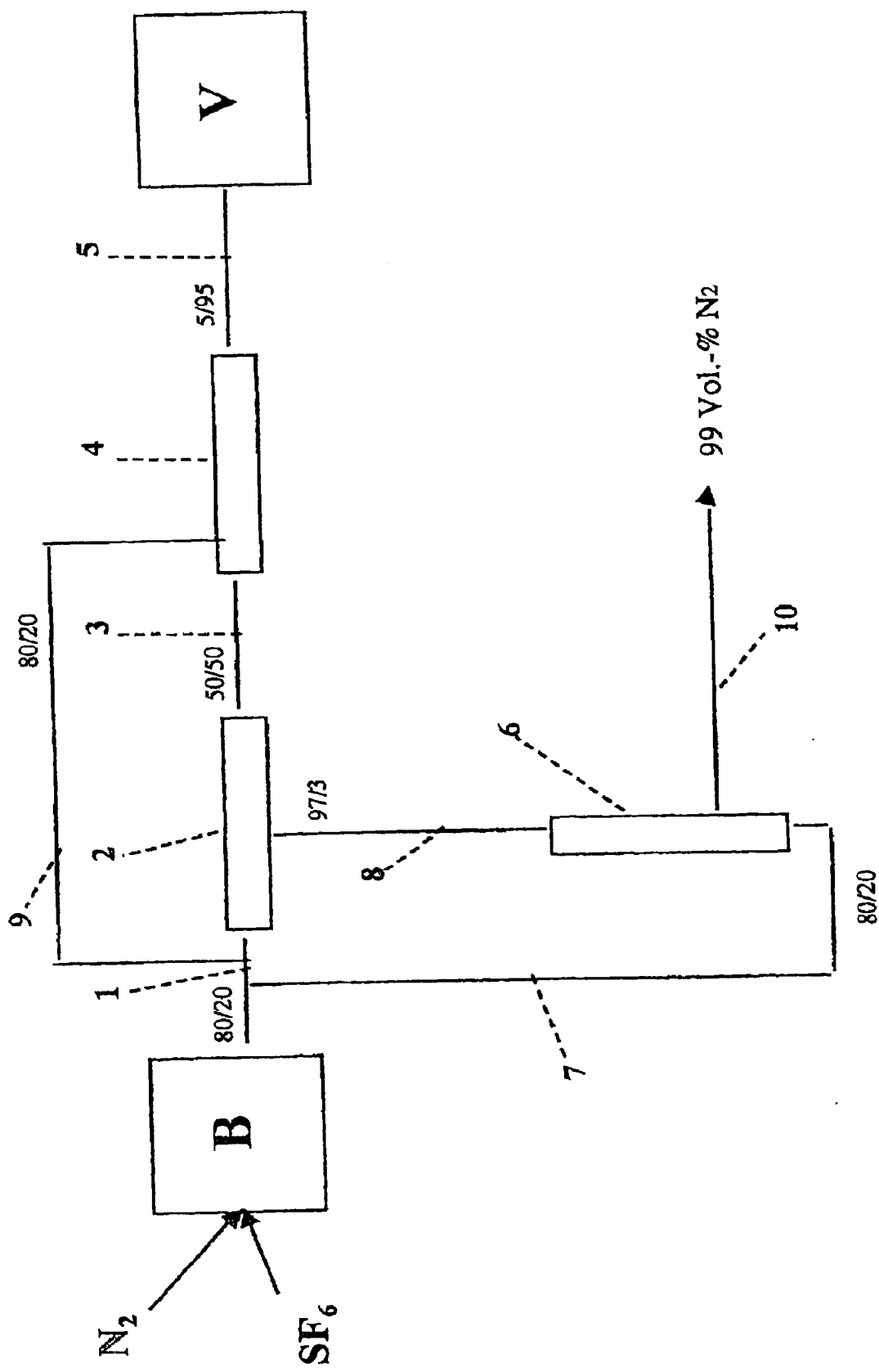

ISOLATION OF SF6 FROM INSULATING GASES IN GAS-INSULATED LINES

CROSS REFERENCE TO RELATED APPLICATIONS

This application is a continuation of international application no. PCT/EP00/00979, filed Feb. 8, 2000, designating the United States of America, the entire disclosure of which is incorporated herein by reference. Priority is claimed based on Federal Republic of Germany patent application no. DE 199 23 155.9, filed May 20, 1999.

BACKGROUND OF THE INVENTION

The present invention relates to a process for separating mixtures which comprise sulfur hexafluoride ($SF_6$) and nitrogen ($N_2$) and which originate from gas-insulated lines ("GIL").

Mixtures of sulfur hexafluoride and nitrogen are used as insulating filler gas for underground cables, see German Utility Model 297 20 507.2. Usually, these mixtures comprise from 5 to 50% by volume of sulfur hexafluoride, and the remainder to 100% by volume nitrogen.

In the context of servicing the lines, or in the event of defects in the lines, it is desirable to be able to separate the gas mixture, in particular for the purpose of reusing the $SF_6$. The resulting $SF_6$ then occupies a very small volume, which is a significant advantage during transport, design of line cross sections, etc.

Li et al., EP 853,970 and U.S. Pat. No. 5,785,741 (=EP 754,487) describe a process for separating gas mixtures, which arise during the manufacture of semiconductors. Gas mixtures of this type may contain perfluoro compounds. The separation of the gas mixtures takes place at membranes. Anumakonda et al., U.S. Pat. No. 5,843,208 describes a process for recovering $SF_6$ from gas mixtures using membranes at a pressure of at most 6.2 bar.

Despite the efforts of the prior art, there has remained a need for improved techniques for separating mixtures of $SF_6$ and $N_2$.

SUMMARY OF THE INVENTION

It is an object of the present invention to provide a new process for separating the abovementioned gas mixtures.

Another object of the invention is to provide a separation process which makes it possible to isolate the $SF_6$ from the mixtures so that it can be reintroduced into the gas-insulated line or reused in a closed product cycle.

A further object is the provision of a suitable apparatus for separating such mixtures.

The process of the invention provides that $SF_6/N_2$ mixtures originating from gas-insulated lines are separated by means of membranes which are able to separate sulfur hexafluoride. The process of the invention can be carried out, for example, during the servicing of gas-insulated high-voltage lines, or in the event of faults, or if there is evidence that the gas in the line requires regeneration. The separated sulfur hexafluoride can be recycled into the gas-insulated line. Depending on the concentration desired, nitrogen is also introduced into the line.

Another possibile use of the process of the invention is to process or work-up mixtures of $SF_6$ and $N_2$ (with or without other impurities) which are found in a gas-insulated line, when the use of the gas-insulated line is terminated and the line is to be scrapped. The $SF_6$ can be recovered from the mixture and supplied for reprocessing.

The $SF_6$ content typically is in the range from 5 to 50% by volume. However, the process of the invention can also be used to separate gas mixtures having a higher $SF_6$ content.

Organic, asymmetric membranes are preferred. Rubbery membranes are known which separate based on the solubility of the permeate. Other membranes separate based on the diffusion property of the permeate; these are non-rubbery membranes, or rather crystalline membranes ("glassy membranes"). This latter type of membrane is especially preferred in the process of the invention.

The membranes can be constructed in a known manner, for example as a membrane made of one or more bundles of hollow-fibers. The membrane can be produced from known materials. Examples of suitable materials include polyimides, polycarbonates, polyesters, polyestercarbonates, polysulfones, polyethersulfones, polyamides, polyphenylene oxides and polyolefins. Preferably, the polymer material is comprised of polyesters, polycarbonates or polyestercarbonates. Membranes made of polycarbonates which are derived from a bisphenol in which at least 25% of the bisphenol units in the polymer chain are tetrahalogenated with chlorine or bromine are especially suitable. Particularly preferred membranes have a polymeric matrix which has two porous surfaces and one layer which makes it possible to separate the sulfur hexafluoride from the other gas constituents. Membranes of this type are described in Sanders et al., U.S. Pat. No. 4,838,904 (=EP 340,262). If additional impurities such as $SO_2F_2$, $SO_2$, or the like are present in the gas mixture, a purification can be carried out in advance, such as washing with water or alkali metal hydroxide solution or treatment with adsorbers.

The separating membranes may advantageously be arranged in a plurality of separating stages. Each membrane stage can consist of a plurality of membrane cartridges arranged in parallel.

The pressure on the inlet side of the membrane or membranes is customarily higher than the ambient pressure. For example, the gas mixture to be separated can be fed to the separating membrane at a pressure of up to 13 bar. Preferably, the membrane feed pressure is from 10 to 12 bar. If a plurality of membranes are provided, a compressor can be disposed upstream of each membrane. The temperature of the gas mixture is advantageously in the range from 10° C. to 40° C.

If two membrane separation stages are provided, the gas streams may advantageously be conducted in the following manner: the mixture to be separated—for example a mixture of sulfur hexafluoride and nitrogen containing 20% by volume of $SF_6$ from gas-insulated high-voltage lines—is fed to the first membrane. Since the membrane preferentially allows nitrogen to pass, a permeate having a high nitrogen content and a low sulfur hexafluoride content is obtained. The permeate is discharged into the environment. The retentate of the first membrane, which already has an elevated $SF_6$ concentration, is fed to a further membrane, i.e., a second membrane separation stage. The permeate resulting from this second membrane is recycled back into the feed stream of the first membrane. The retentate from the second membrane is sulfur hexafluoride containing only low amounts of nitrogen. After liquefaction by a compressor, it can be recycled immediately into the gas-insulated high-voltage line, or it can be stored temporarily and reused in other ways.

The number and arrangement of the membrane cartridges depends on the desired degree of purity and on whether a gas having high or low $SF_6$ content is to be treated. An even better membrane separation effect can be achieved if three membrane stages are employed. Preferably, the three membranes are connected as follows: the $SF_6/N_2$ gas mixture is fed to the first membrane stage as feed stream. The retentate of the first membrane stage is fed to a second membrane stage as feed stream. The retentate of this second stage is highly enriched $SF_6$ and is reprocessable. The permeate of the first membrane stage is used as the feed stream to the third membrane stage. The permeate of this third stage is $N_2$, virtually free of $SF_6$, and can be safely discharged into the environment. The permeate of the second membrane stage and the retentate of the third membrane stage are introduced into the feed stream to the first membrane stage.

It has been found that even one or two membrane stages are sufficient to be able to obtain a sufficiently enriched, purified sulfur hexafluoride and a nitrogen gas having acceptably low amounts of sulfur hexafluoride. A downstream adsorption stage is not needed and therefore is not included in prefered embodiments.

The process of the invention is characterized by excellent separation of the $SF_6/N_2$ mixture from underground cables. The purified nitrogen or purified air can be safely discharged into the environment. The emission of $SF_6$ into the environment is greatly decreased. The recovered sulfur hexafluoride can be re-introduced immediately back into the gas-insulated high-voltage line. However, other operations can also be performed, for example admixing nitrogen, in order to obtain a gas mixture containing desired proportions of the gases.

The invention also relates to a system comprising a gas-insulated, $SF_6/N_2$-filled high-voltage line, a membrane separator installation and connection lines between the gas-insulated high-voltage line and the membrane separator installation. The membrane separator installation may comprise one, two, three or more membrane separation stages having membranes which are preferentially permeable to nitrogen. The foregoing numbers apply to the number of membrane stages. Upstream of the first membrane stage, and preferably upstream of each other membrane stage, there is a compressor. A preferred separator installation has at least two membrane separation stages. It further comprises a connection line for the gas mixture to be separated, which connection line is connected between the gas-insulated high-voltage line and the inlet into the first membrane separation stage. If there are two separation stages, the installation comprises a second connection line between the first and second membrane separation stages, which line is provided for introducing retentate (enriched in $SF_6$) from the first membrane separation stage into the second membrane separation stage. There is also a collection line for retentate from the second membrane separation stage, through which retentate having a high $SF_6$ content can be collected. This collection line connects the membrane separation plant either back to the gas-insulated high-voltage line (connection line for recycling the $SF_6$) or to a tank for temporary storage. In addition, the separator installation has a return line for feeding the permeate of the second membrane stage back into the feed stream of the first membrane stage. Pumps (for example vacuum pumps) and compressors for withdrawing and feeding in the gas mixture or $SF_6$ are provided between gas-insulated line and the membrane separation installation. If desired, other treatment devices can be connected intermediately (compressor, gas mixture for $N_2$ admixture etc.). The permeate of the first membrane stage is largely free of $SF_6$ and can be discharged into the environment.

BRIEF DESCRIPTION OF THE DRAWING

The invention will be described in further detail with reference to the accompanying drawing FIGURE, which is a schematic representation of an illustrative apparatus for carrying out the process of the invention.

DETAILED DESCRIPTION OF A PREFERRED EMBODIMENT

A further particularly preferred system shown schematically in the accompanying drawing FIGURE comprises three membrane stages. Advantageously, they may be connected as described above. Vessel B symbolizes the gas-insulated line and contains a mixture of $N_2$ and $SF_6$. The mixture is conveyed via line 1 into the first membrane stage 2. The retentate from membrane stage 2 is fed via line 3 into the second membrane stage 4. The retentate from the second membrane stage 4 is highly enriched $SF_6$, which is conveyed by line 5 into the storage vessel V, which in the illustrated embodiment is a buffer tank. The permeate of the first membrane stage 2 is fed via line 8 to a third membrane stage 6. The permeate of the third membrane stage is essentially free of $SF_6$ and can be discharged via line 10 into the environment. The retentate of the third separation stage is returned via line 7 to the feed stream supplied to the first membrane stage 2. The permeate of the second membrane stage 4 is likewise returned via line 9 back to the feed stream of the first membrane stage 2. Compressors upstream of the membrane stages, probes for sample analysis, flow meters etc. have been omitted from the drawing for the sake of clarity. The numbers on the drawing figure serve to describe the proportions of the components of the respective gas streams in the following Example 2. They specify the volumetric ratio of $N_2/SF_6$ in the respective lines.

The invention makes it possible in a simple manner to reprocess the $SF_6$ content in gas-insulated lines.

The following examples are intended to describe the invention further without restricting its scope.

The membranes used in the examples were of the hollow fibre type, manufactured by Aga-Gas and sold under the trade designation Nitroprine™. Each membrane separation stage was comprised of three parallel membrane cartridges.

Example 1

Two-stage Process

Nitrogen and sulfur hexafluoride were mixed to generate a gas mixture containing 20% by volume of $SF_6$ and 80% by volume of $N_2$, which corresponds to a gas mixture used in underground cables. The gas mixture, which was pressurized to 13 bar (absolute), was introduced from a vessel B, which corresponds to the gas-insulated line, via the line 1 at a rate of one m³/hour into the first membrane separation stage 2. The permeate leaving the first membrane separation stage comprised 97% by volume of nitrogen and 3% by volume of sulfur hexafluoride.

The retentate of the first membrane separation stage comprised 50% by volume of nitrogen and 50% by volume of sulfur hexafluoride and, after recompression to 13 bar, was introduced via the line 3 into the second membrane separation stage 4. The permeate from the second membrane separation stage comprised 81% by volume of nitrogen and 19% by volume of sulfur hexafluoride. The retentate of the second membrane separation stage comprised 95% by volume of sulfur hexafluoride and 5% by volume of nitrogen. It was introduced via the line 5 into a storage vessel V. This product is so pure that it can be used directly for recycling the $SF_6$.

Example 2

Process Having Three Membranes

The procedure of Example 1 was repeated except with three membranes as illustrated in accordance with the accompanying drawing FIGURE.

The gas mixture to be treated was fed to the first membrane stage, the retentate of which was fed to the second membrane stage. The permeate of the first membrane stage was fed to the third membrane stage.

The retentate of the second membrane stage was highly enriched $SF_6$ (95% by volume, remainder $N_2$) and could be used for reprocessing. The permeate of the second membrane stage was returned via line 9 to the feed stream to the first membrane stage.

The permeate of the third membrane stage comprised only 1% by volume of $SF_6$. The retentate of the third membrane stage was returned via line 7 to the feed stream to the first membrane stage.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for separating a mixture of $SF_6$ and $N_2$, the $SF_6/N_2$ mixture being obtained from a gas insulated line, comprising introducing the mixture to a mobile membrane separator comprising at least one separating membrane which preferentially passes $N_2$, collecting an $SF_6$ enriched retentate, and forming an $N_2$ enriched permeate, wherein said mixture has an initial $SF_6$ content of from 5 to 50 volume-%, said at least one membrane comprises a polymer matrix composed of a polycarbonate made from a bisphenol in which at least 25% of the bisphenol units in the polymer chain are tetrahalogenated with chlorine or bromine, and said mixture is fed to said membrane separator at a membrane feed pressure of 10 to 13 bar.

2. A process according to claim 1, wherein said membrane separator comprising at least one separating membrane comprises at least two separating membrane stages.

3. A process according to claim 2, wherein said membrane separator comprising at least two separating membrane stages comprises three separating membrane stages, the retentate of the first membrane stage is fed to the second membrane stage in order to obtain a mixture with a high $SF_6$ content as retentate from the second membrane stage; the permeate of the first membrane stage is introduced into the third membrane stage; the permeate of the second membrane stage and the retentate of the third membrane stage are recirculated to the feed stream of the first membrane stage, and the permeate of the third membrane stage can be released into the environment.

4. A process according to claim 1, wherein the process is utilized during the use of the gas insulated line to purify the $SF_6/N_2$ mixture.

5. A process according to claim 1, wherein the process is utilized after completed use of the gas insulated line in order to recover $SF_6$ prior to disposal of the used gas insulated line.

6. A method according to claim 1, wherein said $N_2$ enriched permeate comprises at least about 97% by volume nitrogen.

7. A method according to claim 6, wherein said $N_2$ enriched permeate comprises at least about 99% by volume nitrogen.

8. A method according to claim 1, wherein said $SF_6$ enriched retentate comprises at least about 95% by volume sulfur hexafluoride.

9. A method according to claim 1, further comprising discharging said $N_2$ enriched permeate directly to the atmosphere.

10. A system comprising a gas insulated line, a membrane separation stage comprising at least one separating membrane which preferentially passes $N_2$, and at least one connecting line directly connecting the gas insulated line to the membrane separation stage, wherein said membrane separation stage is a mobile membrane separation apparatus, wherein said gas insulated line contains a mixture of $SF_6$ and $N_2$ with an initial $SF_6$ content of from 5 to 50 volume-%, and wherein said at least one connecting line delivers the mixture to said membrane separation stage at a membrane feed pressure of 10 to 13 bar.

11. A system according to claim 10, wherein said at least one separating membrane comprising a polymer matrix composed of a polycarbonate made from a bisphenol in which at least 25% of the bisphenol units in the polymer chain are tetrahalogenated with chlorine or bromine.

12. A system according to claim 10, further comprising a pump or compressor on said connecting line for moving a gas mixture from said gas insulated line to said membrane separation stage.

13. A system according to claim 10, further comprising a discharge line connected to said membrane separation stage to discharge said $N_2$ enriched permeate directly to the atmosphere.

* * * * *